April 29, 1947.  H. A. McARTHUR ET AL  2,419,844
MILKING MACHINE PULSATOR
Filed April 21, 1944   3 Sheets-Sheet 1
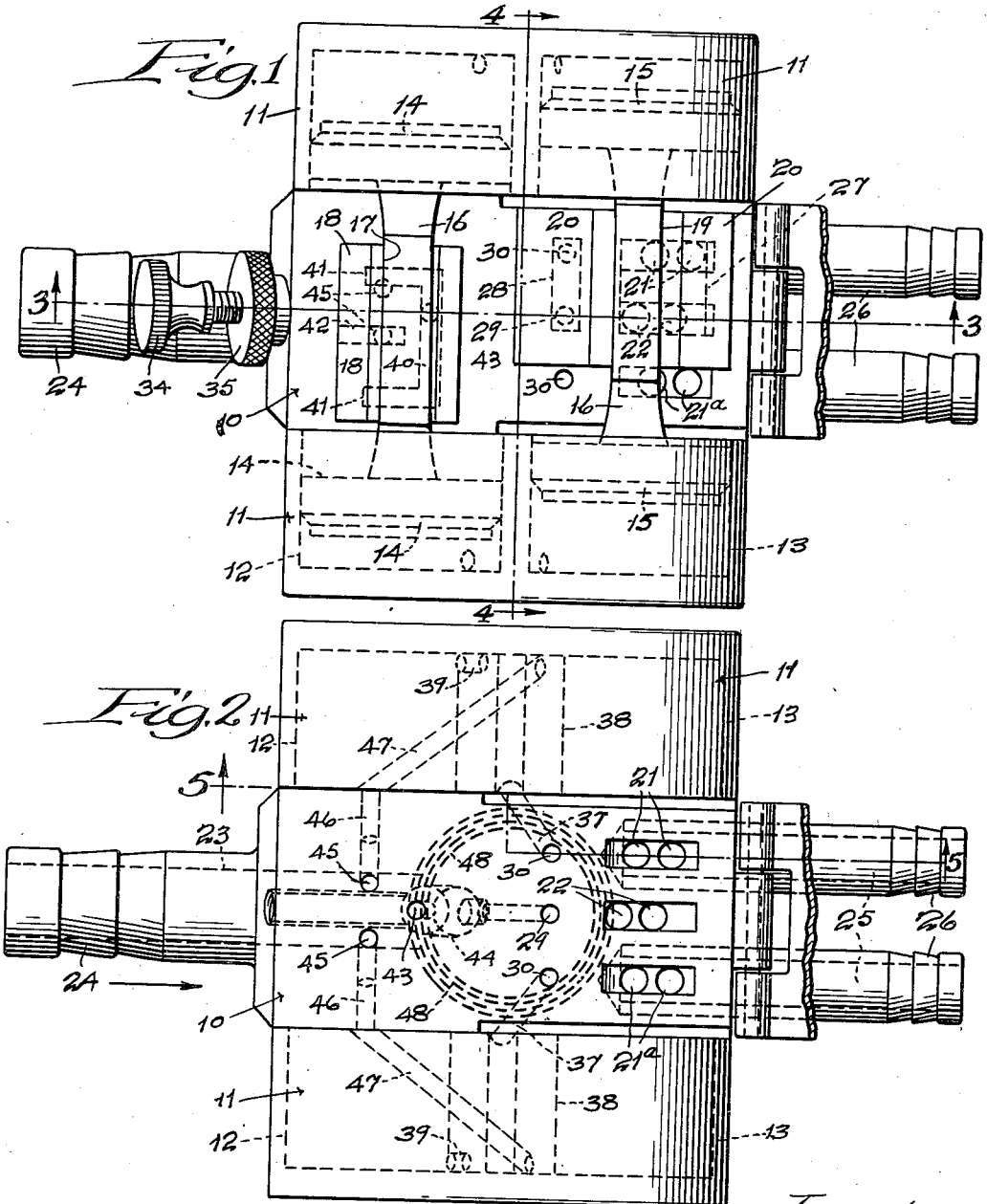
Inventors:
Herbert A. McArthur
and John B. Decker,
By Banning & Banning
Attorneys.

April 29, 1947.  H. A. McARTHUR ET AL  2,419,844
MILKING MACHINE PULSATOR
Filed April 21, 1944    3 Sheets-Sheet 2
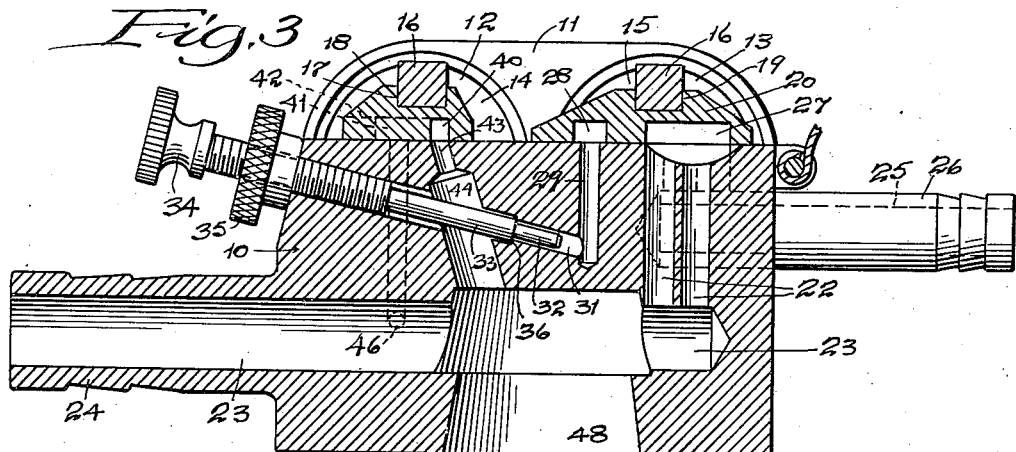
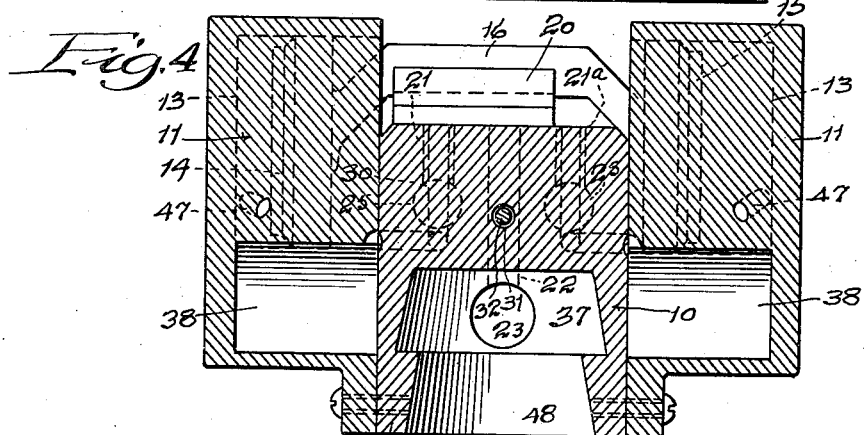
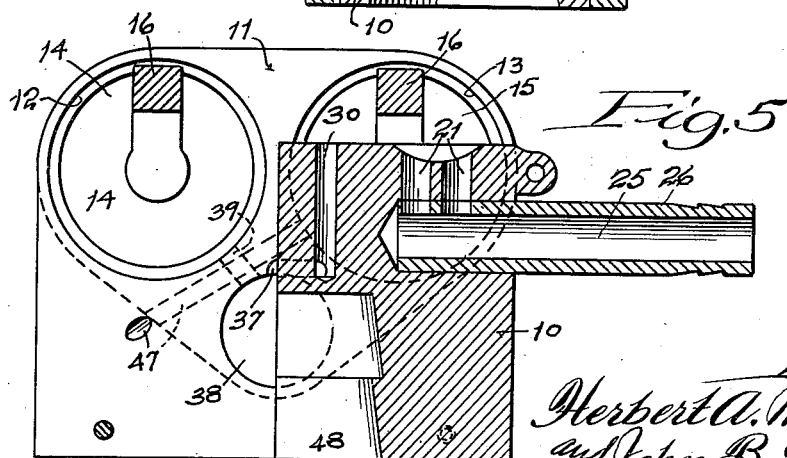
Inventors:
Herbert A. McArthur
and John B. Decker,
By Danning & Danning
Attorneys.

April 29, 1947.   H. A. McARTHUR ET AL   2,419,844
MILKING MACHINE PULSATOR
Filed April 21, 1944   3 Sheets-Sheet 3

Inventors.
Herbert A. McArthur
and John B. Decker,
By Banning Banning
Attorneys.

Patented Apr. 29, 1947

2,419,844

UNITED STATES PATENT OFFICE 2,419,844

MILKING MACHINE PULSATOR

Herbert A. McArthur, Libertyville, and John B. Decker, Evanston, Ill., assignors, by mesne assignments, to Robert Crown, Evanston, Ill.

Application April 21, 1944, Serial No. 532,178

5 Claims. (Cl. 31—62)

The pulsator of the present invention is designed for use in connection with a set of teat cups of the character ordinarily employed in milking machines and for the purpose of alternating the conditions of vacuum and pressure within the spaces intervening between the teat cup shells and the flexible liners which contact the teats. In its general operation the present invention conforms to the conventional practice in the operation of milking machines, and the improvements hereinafter to be described relate to the construction of the slide valves which control the suction and pressure and to the adjustable screw valve which regulates the speed of operation of the pistons. Heretofore it has been customary to employ a needle valve for regulating the frequency of the piston strokes, but it has been found that a needle valve requires such close and accurate adjustment that difficulty is experienced under operating conditions in effecting the intended adjustment, and the present valve is designed to overcome the above difficulty.

Further objects and details of the invention will appear from the description thereof in conjunction with the accompanying drawings wherein Figure 1 is a top plan view of the pulsator.

Fig. 2 is a top plan view with the slide valves and duplex pistons removed.

Fig. 3 is a longitudinal sectional elevation taken on line 3—3 of Fig. 1.

Fig. 4 is a transverse sectional elevation taken on line 4—4 of Fig. 1 looking in the direction of the arrows.

Fig. 5 is a sectional elevation taken on line 5—5 of Fig. 2 looking in the direction of the arrows.

Figure 6:
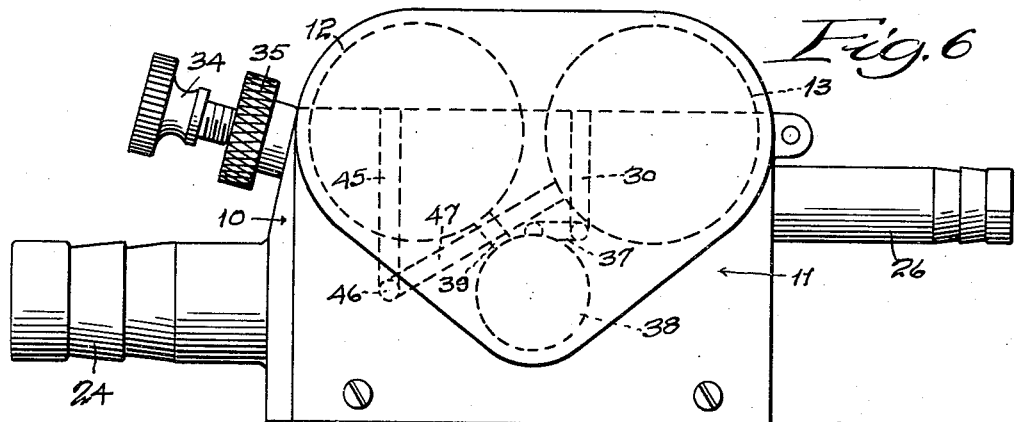
Fig. 6 is a side elevation of the pulsator.
Figure 7:
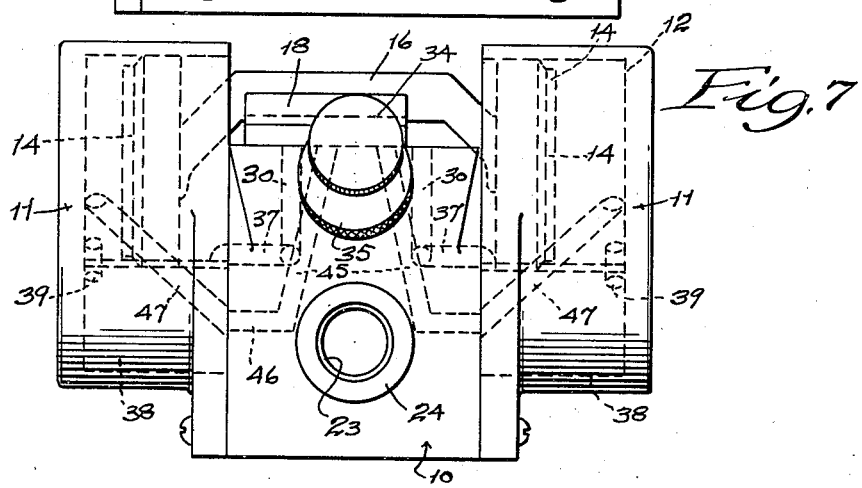
Fig. 7 is an end elevation looking toward the vacuum line nipple.
Figure 8:
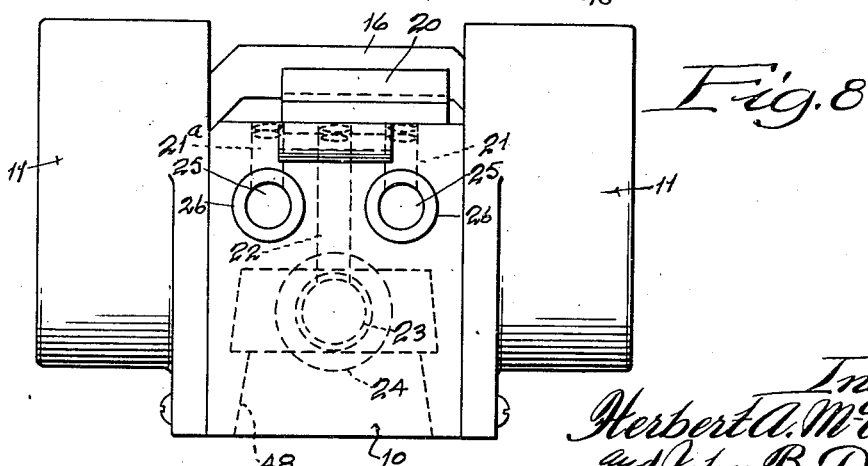

Fig. 8 a similar view looking toward the teat cup tube nipples.

The pulsator, as a whole, is built on a central valve block 10 of rectangular configuration which has secured to each of its sides a cylinder block 11, the base of which lies flush with the base of the valve block while the upper portion of each cylinder block extends above the upper flat face of the valve block; thus, affording a center channel open at its ends and walled in on the sides by the inner faces of the cylinder blocks.

Each cylinder block has formed in its face, front and rear cylindrical recesses 12 and 13 which constitute inwardly opening cylinders for the reception of front and rear duplex pistons 14 and 15, the piston heads of each piston being connected by a bridge connection 16 which arches over the intervening space above the upper face of the valve block. The forward piston bridge is socketed within a groove 17 in a forward slide valve member 18 while the rear piston bridge is socketed within a groove 19 in a rear slide valve member 20. The slide valves are thus engaged by the respective piston bridges so that they move transversely across the flat face of the valve block as the pistons are reciprocated in alternation to one another.

The valve block and the two cylinder blocks are formed of non-corrosive metal such as brass, while the slide valves are formed of a relatively hard plastic, it having been found that the sliding contact of plastic slide valves upon the flat metallic surface of the valve block, avoids any wearing down and irregular grooving of the metallic surface of the valve block which it has been found invariably occurs where a metal to metal contact is maintained by reason of the fact that portions only of the coacting surfaces maintain constant contact during the reciprocation of the valves while other portions of the coacting surfaces are contacted only throughout a portion of the cycle.

The valve block is provided near its rear end with vertical lateral ports 21 and 21ª between which are located vertical center ports 22. The center ports lead downwardly into the rear end of a vacuum bore 23 which extends forwardly through the valve block and is carried through a nipple 24 adapted to make connection with a vacuum line of usual character. The lateral ports 21 and 21ª lead downwardly and each opens into a rearwardly extending bore 25 which is carried out through a vacuum cup nipple 26 which affords connection through suitable tubing with two of the teat cups which are operated in unison and in alternation to the companion teat cups.

The rear slide valve 20 is provided in its underacting face with a square cut recess 27 of suitable dimensions to bridge the space between the pair of center ports 22 and one pair of lateral ports 21 or 21ª, while the external width of the slide valve is such that while one pair of lateral ports are in communication with the center ports, the other pair of lateral ports will be open to atmosphere for the purpose of momentarily breaking the vacuum in the associated teat cups.

In addition to its function in controlling the alternate admission of vacuum and pressure to the teat cups, the rear valve performs the function of controlling the reciprocations of the forward duplex piston, and for this purpose, the slide valve near its forward edge is provided with a transversely extending recess 28 of a length to bridge the space between a central control port 29 and either one of two lateral control ports 30 so disposed that while vacuum is established through one of the lateral ports, the other will be open to atmosphere. The central port 29 communicates near its lower end with an obliquely disposed control valve bore 31 which receives the reduced cylindrical stem 32 of an adjusting screw valve 33 which extends outwardly at an oblique angle through the upper forward portion of the valve block and terminates in a knob 34 adapted to adjust the in and out movements of the screw valve. A lock nut 35 is provided to maintain the adjustment. The reduced cylindrical stem 32 is of a size to afford a slight clearance between the stem and the wall of the bore 31 which bore is shouldered outwardly at the point 36 to receive the enlarged portion of the screw valve stem with a slight clearance throughout to afford restricted communication around the valve stem with its reduced end.

The arrangement is one which differs in its action from that of a needle valve in that it is much less delicate in its control of the suction than a needle valve so that the screw adjustment can be effected more gradually and with less effort toward exact precision than is possible with needle valves of the character heretofore employed to regulate the piston reciprocations of a pulsator.

The lateral control ports 30 extend downwardly and make connection at their lower ends with obliquely disposed passages 37 each of which leads into an associated central chamber 38 which in turn affords communication near its outer end through a port 39 with the base end of the associated forward cylinder, the arrangement being such that as the rear slide valve is moved in one direction, vacuum conditions will be established in the associated forward cylinder on the same side of the pulsator, while at the same time pressure conditions will be established in the opposite forward cylinder.

The movements of the rear slide valve 20, control the back and forth movements of the forward duplex piston. The latter movements are relied upon to alternately establish pressure and vacuum conditions in the rear cylinders. To obtain this result, the under face of the forward slide valve is provided with a groove 40 terminating at each end in a forwardly extending leg 41. The slide valve is also provided in its center with a groove 42 leading to atmosphere. The two-legged groove in all positions of valve adjustment, overlies a center vertical port 43 which leads to an enlarged oblique chamber 44 through which the screw adjusting valve extends without, however, blocking communication from the central vacuum bore 23 so that at all times vacuum conditions will be maintained through the valve block and into the legged groove 40 in the slide valve.

The central port 43 cooperates with two lateral ports 45 so spaced that either may register either with one of the legs of the groove 40 or with the groove 42 leading to atmosphere. In the adjustment shown in Fig. 1, it will be noted that the vacuum port 43 is in partial communication with the upper port 45 while the lower port 45 is in communication with atmosphere. Each of the lateral ports extends downwardly to a horizontal bore 46 the outer end of which communicates with an obliquely disposed passageway 47 leading to the base end of the rear cylinder on the same side of the pulsator. The terms "upper" and "lower" refer to the drawing only and not to the actual relation of the parts.

The valve block in its base is provided with a flaring aperture 48 which affords a socket for mounting the pulsator on the top of a milk pail, not shown, so that constant vacuum conditions will be maintained within the pail in the manner customary in devices of this character.

*Operation*

In operation with the slide valves in the position indicated in Fig. 1, vacuum conditions will be established within the upper teat cup nipple 25 and the two teat cups in communication therewith, while pressure conditions will be established within the two teat cups which communicate with the lower teat cup nipple. As the rear slide valve reaches the end of its upward movement in Fig. 1 which opens the port 30 to atmosphere, pressure conditions will be established in the lower forward cylinder while vacuum conditions will be established in the upper forward cylinder. This will initiate the beginning of a reverse movement of the forward slide valve and this reverse movement (upwardly in Fig. 1) will reverse the conditions of pressure and vacuum in the rear cylinders after a considerable period of movement of the forward slide valve. That is to say, a partial movement of the slide valve will close both vacuum and pressure ports until the movement has been nearly completed, at which time reversed communication will be established through the pressure and vacuum ports which will result in a sudden shifting of the rear duplex piston which controls the pressure and vacuum conditions within the teat cups. The regulation of the screw valve, controls the speed of movement of the forward duplex piston and since this speed regulates the frequency of movement of the rear duplex piston and correspondingly the intervals of rest between pulsations, it is essential that the screw valve control be of such a nature as to permit the operator to properly regulate these movements without danger of over or under adjustment due to extreme delicacy of the valve arrangement.

The structure is one which permits the employment of a single screw valve rather than duplicate valves of the character previously employed which simplifies the construction and ease and accuracy of adjustment while the general construction of the valves and cylinder blocks is one which permits the various passages to be easily drilled from the surface before the assembling of the blocks and in such a way that the ends of related passages will register when the parts are assembled, thereby obviating all difficulties due to turns or angles in the line of communication through the respective passages.

By locating the regulating screw 34 on the side of the block 10 opposite the nipples 26 rather than on the same side, a number of advantages are obtained. The screw is conveniently accessible to the operator in the normal milking position, and when the hose are connected to the nipples 26 for milking they do not interfere with the operator when the operator attempts to regulate the screw either before or after the usual inflations are applied to the cow's teats.

Although the invention has been described with particularity as to detail, it is not the intention, unless otherwise indicated in the claims, to limit the invention to the particular embodiment here shown for purposes of illustration.

We claim:

1. A milking machine pulsator having a hose receiving nipple at one end and a regulating screw at the opposite end and between the two a pneumatic operating mechanism adjacent the nipple and a pneumating timing mechanism adjacent the regulating screw, each of said mechanisms including separate valve means operated thereby, ports controlled by valve means of the timing mechanism and controlling the other mechanism, ports controlled by the valve means of the operating mechanism and controlling the application of vacuum to said hose receiving nipple and an air passageway also controlled by the same last mentioned valve means for controlling the timing mechanism, a bore below the valve means of the timing mechanism and extending from a side of the pulsator opposite that from which the nipple extends, to and intersecting said air passageway, said bore being tapped and said regulating screw being threaded therein with the engaged threads extending below the valve means of the timing mechanism, said regulating screw extending past said timing mechanism to said air passageway and controlling the rate of air flow therethrough for controlling the speed of the timing mechanism.

2. A pulsator for milking apparatus comprising a valve block having at one end thereof a hose receiving nipple, a regulating screw at the opposite end of the block, valve means on the block for controlling the application of vacuum to said nipple, pneumatic operating means for said valve means, air operated timing means, an air passageway controlled by said valve means and controlling the operation of said timing means, air passageways and valve means controlled by the timing means for controlling said pneumatic operating means, said last named valve means being between the regulating screw and the first named valve means, a bore extending in the block from a side thereof opposite that from which the nipple extends and at a location thereon below both valve means to and intersecting the first mentioned air passageway, said bore being tapped and said regulating screw being threaded therein with the engaged threads located beneath the valve means of the timing means, said regulating screw extending past the second mentioned air passageways to said first mentioned air passageway and including means for choking said first mentioned air passageway.

3. A pulsator for milking apparatus, comprising a flat topped valve block, two cylinder blocks on opposite sides of the valve block and each having a pair of cylinder bores, the corresponding bores in the opposite cylinder blocks being in alignment, interconnected operating pistons and interconnected timing pistons in the respective aligned cylinder bores, air passageways for the cylinder bores terminating in ports at the top of the valve block, valve means operated by the timing pistons for controlling the establishment of vacuum connections alternately to the respective ports leading to the cylinders having the operating pistons therein, a vacuum passageway, valve means operated by the operating pistons for connecting the vacuum passageway alternately to the respective ports leading to the cylinders having the timing pistons therein, air flow regulating means in said vacuum passageway, said air flow regulating means comprising a regulating screw threaded into the valve block and having a portion extending into said vacuum passageway and almost but not quite of the same cross sectional area as said vacuum passageway so that there is a choked clearance space for the flow of air in said vacuum passageway, whereby upon threading the screw into variable positions the length of the choked air path is altered to alter the resistance to air flow, said screw entering into the valve block from a side thereof that extends downwardly from the top of the block and adjacent the cylinders containing the timing pistons and remote from the cylinders containing the operating pistons.

4. A pulsator for milking apparatus, comprising a flat topped valve block, two cylinder blocks on opposite sides of the valve block and each having a pair of cylinder bores, the corresponding bores in the opposite cylinder blocks being in alignment, interconnected operating pistons and interconnected timing pistons in the respective aligned cylinder bores, air passageways for the cylinder bores terminating in ports at the top of the valve block, valve means operated by the timing pistons for controlling the establishment of vacuum connections alternately to the respective ports leading to the cylinders having the operating pistons therein, a vacuum passageway, valve means operated by the operating pistons for connecting the vacuum passageway alternately to the respective ports leading to the cylinders having the timing pistons therein, air flow regulating means in said vacuum passageway, said air flow regulating means comprising a regulating screw threaded into the valve block and having a portion extending into said vacuum passageway and almost but not quite of the same cross sectional area as said vacuum passageway so that there is a choked clearance space for the flow of air in said vacuum passageway, whereby upon threading the screw into variable positions the length of the choked air path is altered to alter the resistance to air flow, said screw entering into the valve block from a side thereof that extends downwardly from the top of the block and adjacent the cylinders containing the timing pistons and remote from the cylinders containing the operating pistons, a hose receiving nipple extending from the side of the valve block opposite the side from which the regulating means extends, said block having a port extending from said nipple to the top of the block and controlled by the valve means operated by the operating piston.

5. A pulsator for milking apparatus, comprising a flat top valve block, two cylinder blocks on opposite sides of the valve block and each having a pair of cylinder bores, the corresponding bores in the opposite cylinder blocks being in alignment, interconnected operating pistons and interconnected timing pistons in the respective aligned cylinder bores, air passageways for the cylinder bores terminating in ports at the top of the valve block, a vacuum passageway extending into the block, valve means operated by the timing pistons for controlling the establishment of vacuum connections from said vacuum passageway alternately to the respective ports leading to the cylinders having operating pistons therein, a control passageway, valve means operated by the operating pistons for connecting the control passageway alternately to the respective ports having the timing pistons therein, air flow regulating means comprising a regulating screw threaded into the valve block and entering the valve block from below the top thereof and extending into the control passageway and forming in said control passageway a choked path for the flow of air in said control passageway, which choked path is of a variable length depending upon the extent to which the screw is threaded into the valve block, said vacuum passageway intersecting the control passageway between the choked path and the portion of the regulating screw that leads to the outside of the valve block.

HERBERT A. McARTHUR.
JOHN B. DECKER.

REFERENCES CITED

The following references are of record in the file of this patent:

UNITED STATES PATENTS

| Number | Name | Date |
| --- | --- | --- |
| 2,333,019 | Lemm | Oct. 26, 1943 |
| 1,875,083 | McCornack | Aug. 30, 1932 |
| 2,253,341 | Michaels | Aug. 19, 1941 |
| 1,392,346 | McCornack | Oct. 4, 1921 |
| 1,494,248 | Johnson | May 13, 1924 |